United States Patent
Scherer et al.

(10) Patent No.: US 6,403,745 B1
(45) Date of Patent: Jun. 11, 2002

(54) GRADIENT COPOLYMERS, AS WELL AS A METHOD FOR THEIR PREPARATION AND THEIR USE

(75) Inventors: Markus Scherer, Lebach (DE); Joseph Martin Bollinger, N.Wales; Joan Souchik, Blue Bell, both of PA (US)

(73) Assignee: RohMax Additives GmbH, Darmstadt (DE)

( * ) Notice: Subject to any disclaimer, the term of this patent is extended or adjusted under 35 U.S.C. 154(b) by 0 days.

(21) Appl. No.: 09/450,720

(22) Filed: Nov. 30, 1999

(51) Int. Cl.$^7$ .............................................. C08F 118/02
(52) U.S. Cl. .................... 526/319; 526/318.2; 526/318; 526/317.1; 526/328; 526/328.5; 526/90; 526/95
(58) Field of Search .............................. 526/318.2, 318, 526/317.1, 319, 328, 328.5, 90, 95

(56) References Cited

U.S. PATENT DOCUMENTS 5,368,761 A    11/1994   Gore et al.

FOREIGN PATENT DOCUMENTS

| EP | 0 153 209 A | 8/1985 |
| EP | 0 236 844 | 9/1987 |
| EP | 0 861 859 A | 9/1998 |
| EP | 0 861 859 | 9/1998 |
| GB | 906 412 A | 9/1962 |
| WO | WO 96/30421 | 10/1996 |
| WO | WO 97/18247 | 5/1997 |
| WO | WO 9734940 | 9/1997 |
| WO | WO 98/40415 | 9/1998 |
| WO | WO 98404415 | * 9/1998 |

* cited by examiner

*Primary Examiner*—David W. Wu
*Assistant Examiner*—William K Cheung
(74) *Attorney, Agent, or Firm*—Oblon, Spivak, McClelland, Maier & Neustadt, P.C.

(57) ABSTRACT

This invention concerns gradient copolymers, that are obtainable by polymerizing a mixture of olefinically unsaturated monomers that consist of a) 0 to 40% by weight of one or more ethylenically unsaturated ester compounds of formula (I)

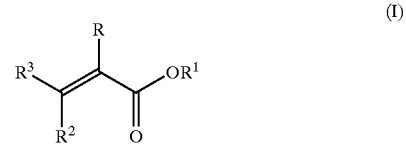

(I)

where R is hydrogen or methyl, $R^1$ means a linear or branched alkyl residue with 1 to 5 carbon atoms, $R^2$ and $R^3$ independently represent hydrogen or a group of the formula —COOR', where R' means hydrogen or an alkyl group with 1 to 5 carbon atoms, b) 10 to 98% by weight of one or more ethylenically unsaturated ester compounds of formula (II)

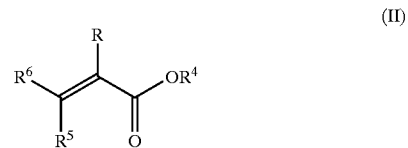

(II)

where R is hydrogen or methyl, $R^4$ means a linear or branched alkyl residue with 6 to 15 carbon atoms, $R^5$ and $R^6$ independently are hydrogen or a group of the formula —COOR", where R" means hydrogen or an alkyl group with 6 to 15 carbon atoms, c) 0 to 80% by weight of one or more ethylenically unsaturated ester compounds of formula (III)

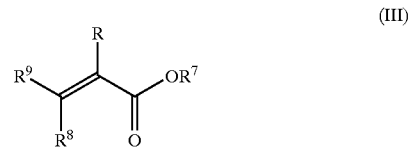

(III)

where R is hydrogen or methyl, $R^7$ means a linear or branched alkyl residue with 16 to 30 carbon atoms, $R^8$ and $R^9$ independently are hydrogen or a group of the formula —COOR'" where R'" means hydrogen or an alkyl group with 16 to 30 carbon atoms, d) 0 to 50 % by weight comonomer, where the indication of % by weight in each case refers to the total weight of the ethylenically unsaturated monomers, where the mixture of the ethylenically unsaturated monomers is varied during chain growth in order to obtain copolymers that have a gradient.

The new copolymers are used as pour point depressants.

17 Claims, No Drawings

GRADIENT COPOLYMERS, AS WELL AS A METHOD FOR THEIR PREPARATION AND THEIR USE

This invention concerns gradient copolymers, concentrates and lubricant oils that contain these copolymers, method for preparation of these copolymers as well as their use as pour point depressants.

Lubricants, especially mineral oils obtained from petroleum by distillation, for example, contain as a rule long-chain n-alkanes, which on the one hand bring about good viscosity/temperature behavior, but on the other hand precipitate out in crystalline form upon cooling and in this way have an adverse effect on the flow of the oil or completely prevent ("plug") it. An improvement of low temperature flow properties can be achieved, for example, by dewaxing. However, costs rise considerably if complete dewaxing is supposed to be achieved. For this reason a pour point up to a range of approximately −15° C. is achieved by partial dewaxing, and this pour point can be further lowered by the addition of the so-called pour point depressants or pour point improvers. These agents can effectively reduce the pour point even in concentrations of 0.01–1 wt %.

However, the mode of action of these compounds has not yet been completely clarified. In any case it is assumed that paraffin-like compounds become incorporated into the growing paraffin crystal surfaces and so stop further crystallization and in particular the formation of extended crystal structures.

Certain structural elements are known to have pour point depressant activity. In particular, polymers with sufficiently long alkyl side chains exhibit a pour point and flow improving effect. Here it is assumed that these alkyl groups become incorporated into the growing paraffin crystals and disrupt crystal growth (see Ullmann's Encyclopedia of Industrial Chemistry, 4$^{th}$ Edition, Vol. 20, Verlag Chemie, 1981, p. 548). On top of that, it is required of industrially usable pour point depressants that they have good thermal, oxidative and chemical stability, shear strength, etc. Moreover, it should be possible to produce the pour point and flow improvers on a cost favorable basis, since they are used in large quantities.

Polymethacrylates with long chain alkyl residues are used to a wide extent as pour point depressants. These compounds are described, for example, in U.S. Pat. No. 2,091,627, U.S. Pat. No. 2,100,993, U.S. Pat. No. 2,114,233 and EP-A-0 236 844. In general, these pour point depressants are produced by radical polymerization. Accordingly, they can be produced on a cost favorable basis.

EP-A-0 861 859 is cited as the closest prior art. It has been established that different pour point depressants have different performances in different lubricant oils. However, if the composition is varied over the reaction time of polymerization, one obtains additives that have high efficiency in very many mineral oils. By this method mixtures of statistical copolymers are produced, since the composition of the monomer mixture remains constant during the lifetime of the radicals (about 1 second).

The low temperature properties, which follow for example from the pour points in accordance with ASTM D-97, the minirotary viscosimetry test values in accordance with ASTM D-4684 or the scanning Brookfield results in accordance with ASTM D-5133, are usable for many applications, but all the same the low temperature properties are still not sufficient for many applications.

Here one should take into account that more effective additives could be added in a smaller quantity in order to achieve a desired flow property at low temperatures. With the amounts of lubricants and diesel biofuels that are used there would be a considerable potential for savings even with relatively small differences.

Taking into consideration the prior art, it is now a task of this invention to make available additives through which improved flow properties of lubricants and diesel biofuels at low temperatures can be achieved, compared to the traditional additives. In addition, a task of the invention was to make available additives that have high stability with respect to oxidation and thermal stress as well as high shear strength. At the same time, the new additives are supposed to be produceable in a simple and cost favorable way.

These as well as other not explicitly mentioned tasks, which, however, can easily be derived or developed from the introductory material, are solved by gradient polymers with all of the characteristics of Claim 1. Expedient modifications of the copolymers in accordance with the invention are provided protection in the claims that refer back to Claim 1. With regard to the concentrate as lubricant additive, Claim 6 provides the solution of the underlying task, while claims 8 and 10 protect lubricants or diesel biofuels that contain the polymers in accordance with the invention. Claim 12 represent a solution of the problem with respect to the method for preparation of gradient copolymers and their use.

Gradient copolymers that have high efficiency as pour point depressants or flow improvers are obtained by polymerizing a mixture of olefinically unsaturated monomers consisting of a) 0 to 40 wt % of one or more ethylenically unsaturated ester compounds of formula (I)

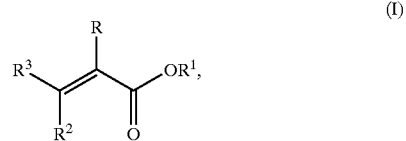

where R is hydrogen or methyl, $R^1$ means a linear or branched alkyl residue with 1 to 5 carbon atoms, $R^2$ and $R^3$ independently represent hydrogen or a group of the formula —COOR', where R' means hydrogen or an alkyl group with 1 to 5 carbon atoms, b) 10 to 98 wt % of one or more ethylenically unsaturated ester compounds of formula (II)

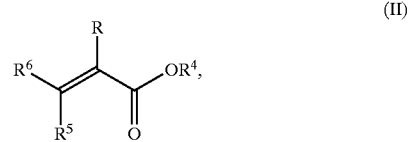

where R is hydrogen or methyl, $R^4$ means a linear or branched alkyl-residue with 6 to 15 carbon atoms, $R^5$ and $R^6$ independently are hydrogen or a group of the formula —COOR", where R" means hydrogen or an alkyl group with 6 to 15 carbon atoms, c) 0 to 80 wt % of one or more ethylenically unsaturated ester compounds of formula (III)

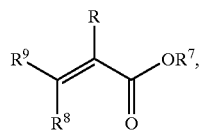

(III)

where R is hydrogen or methyl, $R^7$ means a linear or branched alkyl residue with 16 to 30 carbon atoms, $R^8$ and $R^9$ independently are hydrogen or a group of the formula —COOR''' where R''' means hydrogen or an alkyl group with 16 to 30 carbon atoms, d) 0 to 50 wt % comonomer, where the mixture of ethylenically unsaturated monomers is varied during chain growth. The pour point depressant effect can be determined, for example, in accordance with ASTM D 97.

Moreover, lubricants that contain the gradient copolymers in accordance with the invention produce excellent minirotary viscosimetry values (MRV), which can be found in accordance with ASTM D 4684, and scanning Brookfield results, as are obtained in accordance with ASTM D 5133.

Diesel biofuels, which contains gradient copolymers of the present invention, exhibit exceptional results in cold filter plugging point measurements by IP 309 or low temperature flow tests in accordance with ASTM D 4539. If certain flow properties at a given temperature are supposed to be achieved, the amount of additive can be reduced through this invention.

At the same time a number of other advantages can be achieved through the copolymers in accordance with the invention. Among these are:

The copolymers of this invention are characterized by a narrow molecular weight distribution. A high stability toward shearing effects is achieved through this.

The gradient copolymers in accordance with the invention can be produced on a cost favorable basis.

The copolymers exhibit high resistance to oxidation and are chemically very stable.

The gradient copolymers exhibit excellent efficiency in many different mineral oils or diesel biofuels.

Gradient copolymers designate copolymers that have a gradient. Copolymers are substantially known and indicate polymers that are obtained by polymerization of two or more different monomers.

The term "gradient" refers to the distribution of the monomer units, also called repeating units, along the main chain of the copolymer. Here the concentration of at least one monomer unit is higher at one end of the polymer chain than at the other. If the main chain is divided into 10 equal segments, the concentration of at least one repeating unit increases or decreases in at least three successive segments. The repeating units result from the polymerization of the monomers that are used in each case.

An interesting aspect of this invention consists of gradient copolymers that are characterized by a linear gradient.

In the preferred gradient polymers with a linear gradient the concentration of at least one repeating unit increases over at least eight of the ten segments. On the other hand, the increase over all segments is approximately constant.

Another interesting aspect consists of gradient copolymers that have a nonlinear gradient. These preferred polymers are also characterized by the fact that the concentration of at least one monomer increases over at least eight of the ten segments. However, the increase of the concentration of repeating units is not constant, but rather the increase rises over at least three of the nine segments.

Preferred gradient copolymers have a gradient of at least 5%, especially preferably at least 10% and really especially preferably at least 20%, which refers to the difference of concentrations of the first and last segments.

The term "concentration of monomer units" refers to the number of these units that are derived from the monomers that are used, with respect to the total number of repeating units within a segment. The length of a segment and thus the total number results from the number average molecular weight $M_n$, which is divided by 10, in order to obtain the total number of repeating units in a segment.

Correspondingly, the term "concentration difference" means the difference between the concentrations of at least one monomer unit of two segments.

The polydispersity of polymers is known to the specialist. Accordingly, the data referring to the increase of concentration of at least one repeating unit also refers to a statistical average over all of the polymer chains of the corresponding segments.

The compositions from which the gradient copolymers in accordance with the invention contain, in particular, (meth) acrylates, maleates and fumarates that have different alcohol residues. The term (meth)acrylates includes methacrylates and acrylates as well as mixtures of the two. These monomers are to a large extent known. Here the alkyl residue can be linear, cyclic or branched.

Mixtures from which the gradient copolymers in accordance with the invention can be obtained can contain 0 to 40 wt %, especially 0.5 to 20 wt % of one or more ethylenically unsaturated ester compounds of formula (I)

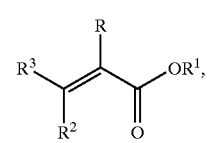

(I)

where R is hydrogen or methyl, $R^1$ means a linear or branched alkyl residue with 1 to 5 carbon atoms, $R^2$ and $R^3$ are independently hydrogen or a group of the formula —COOR', where R' means hydrogen or an alkyl group with 1 to 5 carbon atoms.

Examples of component (a) are, among others, (meth) acrylates, fumarates and maleates, which derive from saturated alcohols such as methyl (meth)acrylate, ethyl (meth) acrylate, n-propyl (meth)acrylate, isopropyl (meth)acrylate, n-butyl (meth)acrylate, tert-butyl (meth)acrylate and pentyl (meth)acrylate; cycloalkyl (meth)acrylates, like cyclopentyl (meth)acrylate; (meth)acrylates that derive from unsaturated alcohols like 2-propynyl (meth)acrylate, allyl (meth)acrylate and vinyl (meth)acrylate.

As an important component, the composition to be polymerized contains 10 to 98 wt %, especially 20 to 95 wt % of one or more ethylenically unsaturated ester compounds of formula (II)

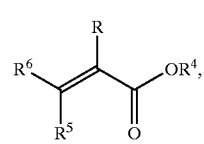

(II)

where R is hydrogen or methyl, $R^4$ means a linear or branched alkyl residue with 6 to 15 carbon atoms, $R^5$ and $R^6$ are independently hydrogen or a group of the formula —COOR″, where R″ means hydrogen or an alkyl group with 6 to 15 carbon atoms.

Among these are (meth)acrylates, fumarates and maleates, which derive from saturated alcohols, such as hexyl (meth)acrylate, 2-ethylhexyl (meth)acrylate, heptyl (meth)acrylate, 2-tert-butylheptyl (meth)acrylate, octyl (meth)acrylate, 3-isopropylheptyl (meth)acrylate, nonyl (meth)acrylate, decyl (meth)acrylate, undecyl (meth) acrylate, 5-methylundecyl (meth)acrylate, dodecyl (meth) acrylate, 2-methyldodecyl (meth)acrylate, tridecyl (meth) acrylate, 5-methyltridecyl (meth)acrylate, tetradecyl (meth) acrylate, pentadecyl (meth)acrylate; (meth)acrylates that derive from unsaturated alcohols such as oleyl (meth) acrylate; cycloalkyl (meth)acrylates such as 3-vinylcyclohexyl (meth)acrylate, cyclohexyl (meth) acrylate, bornyl (meth)acrylate; and the corresponding fumarates and maleates.

Moreover, the monomer mixtures to be used can contain 0 to 80 wt %, preferably 0.5 to 60 wt % of one or more ethylenically unsaturated ester compounds of formula (III)

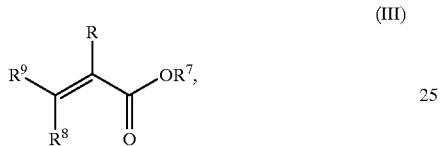

(III)

where R is hydrogen or methyl, $R^7$ means a linear or branched alkyl residue with 16 to 30 carbon atoms, $R^8$ and $R^9$ are independently hydrogen or a group of the formula —COOR‴, where R‴ means hydrogen or an alkyl group with 16 to 30 carbon atoms.

Examples of component (c) are, among others, (meth) acrylates that derive from saturated alcohols, such as hexadecyl (meth)acrylate, 2-methylhexadecyl (meth)acrylate, heptadecyl (meth)acrylate, 5-isopropylheptadecyl (meth) acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth) acrylate, eicosyl (meth)acrylate, cetyleicosyl (meth)acrylate, stearyleicosyl (meth)acrylate, docosyl (meth)acrylate, and/ or eicosyltetratriacontyl (meth)acrylate; cycloalkyl (meth) acrylates such as 2,4,5-tri-t-butyl-3-vinylcyclohexyl (meth) acrylate, 2,3,4,5-tetra-t-butylcyclohexyl methacrylate; oxiranyl methacrylates such as 10,11-epoxyhexadecyl methacrylate; as well as the corresponding fumarates and maleates.

The ester compounds with a long-chain alcohol residue, especially components (b) and (c), can be obtained, for example, by reacting (meth)acrylates fumarates, maleates and/or the corresponding acids with long chain fatty alcohols, where, in general, a mixture of esters such as (meth)acrylates with different long chain alcohol residues results. These fatty alcohols include, among others, Oxo Alcohol® 7911 and Oxo Alcohol® 7900, Oxo Alcohol® 1100 (Monsanto); Alphanol® 79 (ICI); Nafol® 1620, Alfol® 610 and Alfol® 810 (Condea); Epal® 610 and Epal® 810 (Ethyl Corporation); Linevol® 79, Linevol® 911 and Dobanol® 25L (Shell AG); Lial 125 (Augusta® Mailand); Dehydad® and Lorol® (Henkel KGaA) and Linopol® 7–11 and Acropol® 91 (Ugine Kuhlmann).

Of the ethylenically unsaturated ester compounds, the (meth)acrylates are particularly preferred over the maleates and fumarates, i.e., $R^2$, $R^3$, $R^5$, $R^6$, $R^8$, $R^9$ of formulas (I), (II) and (III) represent hydrogen in particularly preferred embodiments.

Component (d) comprises in particular ethylenically unsaturated monomers that can copolymerize with the ethylenically unsaturated ester compounds of formula (I), (II) and/or (III).

However, comonomers that correspond to the following formula are especially suitable for polymerization in accordance with the invention:

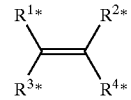

where $R^{1*}$ and $R^{2*}$ independently are selected from the group consisting of hydrogen, halogens, CN, linear or branched alkyl groups with 1 to 20, preferably 1 to 6 and especially preferably 1 to 4 carbon atoms, which can be substituted with 1 to (2n+1) halogen atoms, where n is the number of carbon atoms of the alkyl group (for example $CF_3$), α, β-unsaturated linear or branched alkenyl or alkynyl groups with 2 to 10, preferably 2 to 6 and especially preferably 2 to 4 carbon atoms, which can be substituted with 1 to (2n−1) halogen atoms, preferably chlorine, where n is the number of carbon atoms of the alkyl group, for example $CH_2=CCl—$, cycloalkyl groups with 3 to 8 carbon atoms, which can be substituted with 1 to (2n−1) halogen atoms, preferably chlorine, where n is the number of carbon atoms of the cycloalkyl group; $C(=Y^*)R^{5*}$, $C(=Y^*)NR^{6*}$ $R^{7*}$, $Y^*C(=Y^*)R^{5*}$, $SOR^{5*}$, $SO_2R^{5*}$, $OSO_2R^{5*}$, $NR^{8*}SO_2R^{5*}$, $PR^{5*}_2$, $P(=Y^*)R^{5*}_2$, $Y^*PR^{5*}_2$, $Y^*P(=Y^*)R^{5*}_2$, $NR^{8*}_2$, which can be quaternized with an additional $R^{8*}$, aryl, or heterocyclyl group, where $Y^*$ can be $NR^{8*}$, S or O, preferably O; $R^{5*}$ is an alkyl group with 1 to 20 carbon atoms, an alkylthio group with 1 to 20 carbon atoms, $OR^{15}$ ($R^{15}$ is hydrogen or an alkali metal), alkoxy with 1 to 20 carbon atoms, aryloxy or heterocyclyloxy; $R^{6*}$ and $R^{7*}$ independently are hydrogen or an alkyl group with 1 to 20 carbon atoms, or $R^{6*}$ and $R^{7*}$ together can form an alkylene group with 2 to 7, preferably 2 to 5 carbon atoms, where they form a 3 to 8 member, preferably 3 to 6 member ring, and $R^{8*}$ is hydrogen, linear or branched alkyl or aryl groups with 1 to 20 carbon atoms;

$R^{3*}$ and $R^{4*}$ independently are chosen from the group consisting of hydrogen, halogen (preferably fluorine or chlorine), alkyl groups with 1 to 6 carbon atoms and $COOR^{9*}$, where $R^{9*}$ is hydrogen, an alkali metal or an alkyl group with 1 to 40 carbon atoms, or $R^{1*}$ and $R^{3*}$ can together form a group of the formula $(CH_2)_{n'}$, which can be substituted with 1 to 2n' halogen atoms or $C_1$ to $C_4$ alkyl groups, or can form a group of the formula $C(=O)—Y^*—C(=O)$, where n' is from 2 to 6, preferably 3 or 4, and $Y^*$ is defined as before; and where at least 2 of the residues $R^{1*}$, $R^{2*}$, $R^{3*}$ and $R^{4*}$ are hydrogen or halogen.

These include, among others, hydroxyalkyl (meth) acrylates like 3-hydroxypropyl methacrylate, 3,4-dihydroxybutyl methacrylate, 2-hydroxyethyl methacrylate, 2-hydroxypropyl methacrylate, 2,5-dimethyl-1,6-hexanediol (meth)acrylate, 1,10-decanediol (meth)acrylate;

aminoalkyl (meth)acrylates like N-(3-dimethylaminopropyl)methacrylamide, 3-diethylaminopentyl methacrylate, 3-dibutylaminohexadecyl (meth)acrylate;

nitriles of (meth)acrylic acid and other nitrogen-containing methacrylates like

N-(methacryloyloxyethyl)diisobutylketimine,
N-(methacryloyloxyethyl)dihexadecylketimine,
methacryloylamidoacetonitrile,
2-methacryloyloxyethylmethylcyanamide, cyanomethyl methacrylate;

aryl (meth)acrylates like benzyl methacrylate or phenyl methacrylate, where the aryl residue in each case can be unsubstituted or substituted up to four times;

carbonyl-containing methacrylates like 2-carboxyethyl methacrylate, carboxymethyl methacrylate, oxazolidinylethyl methacrylate, N-(methacryloyloxy) formamide, acetonyl methacrylate, N-methacryloylmorpholine, N-methacryloyl-2-pyrrolidinone, N-(2-methyacryloxyoxyethyl)-2-pyrrolidinone, N-(3-methacryloyloxypropyl)-2-pyrrolidinone, N-(2-methyacryloyloxypentadecyl)-2-pyrrolidinone, N-(3-methacryloyloxyheptadecyl)-2-pyrrolidinone;

glycol dimethacrylates like 1,4-butanediol methacrylate, 2-butoxyethyl methacrylate, 2-ethoxyethoxymethyl methacrylate, 2-ethoxyethyl methacrylate;

methacrylates of ether alcohols like tetrahydrofurfuryl methacrylate, vinyloxyethoxyethyl methacrylate, methoxyethoxyethyl methacrylate, 1-butoxypropyl methacrylate, 1-methyl-(2-vinyloxy)ethyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethoxymethyl methacrylate, 2-ethoxyethyl methacrylate, allyloxymethyl methacrylate, 1-ethoxybutyl methacrylate, methoxymethyl methacrylate, 1-ethoxyethyl methacrylate, ethoxymethyl methacrylate;

methacrylates of halogenated alcohols like 2,3-dibromopropyl methacrylate, 4-bromophenyl methacrylate, 1,3-dichloro-2-propyl methacrylate, 2-bromoethyl methacrylate, 2-iodoethyl methacrylate, chloromethyl methacrylate;

oxiranyl methacrylates like 2,3-epoxybutyl methacrylate, 3,4-epoxybutyl methacrylate, 10,11-epoxyundecyl methacrylate, 2,3-epoxycyclohexyl methacrylate; glycidyl methacrylate;

phosphorus-, boron- and/or silicon-containing methacrylates like 2-(dimethylphosphato)propyl methacrylate, 2-(ethylphosphito)propyl methacrylate, dimethylphosphinomethyl methacrylate, dimethylphosphonoethyl methacrylate, diethylmethacryloyl phosphonate, dipropylmethacryloyl phosphate, 2-(dibutylphosphono)ethyl methacrylate, 2,3-butylenemethacryloylethyl borate, methyldiethoxymethacryloylethoxysiliane, diethylphosphatoethyl methacrylate;

sulfur-containing methacrylates like ethylsulfinylethyl methacrylate, 4-thiocyanatobutyl methacrylate, ethylsulfonylethyl methacrylate, thiocyanatomethyl methacrylate, methylsulfinylmethyl methacrylate, bis(methacryloyloxyethyl) sulfide;

trimethacrylates like trimethyloylpropane trimethacrylate;

vinyl halides such as vinyl chloride, vinyl fluoride, vinylidene chloride and vinylidene fluoride;

heterocyclic (meth)acrylates like 2-(1-imidazolyl)ethyl (meth)acrylate, 2-(4-morpholinyl)ethyl (meth)acrylate and 1-(2-methacryloyloxyethyl)-2-pyrrolidone;

vinyl esters like vinyl acetate;

styrene, substituted styrenes with an alkyl substituent in the side chain, such as α-methylstyrene and α-ethylstyrene, substituted styrenes with an alkyl substituent on the ring, such as vinyltoluene and p-methylstyrene, halogenated styrenes such as monochlorostyrenes, dichlorostyrenes, tribromostyrenes and tetrabromostyrenes;

heterocyclic vinyl compounds like 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

vinyl and isoprenyl ethers;

maleic acid and maleic acid derivatives, such as mono- and diesters of maleic acid, maleic anhydride, methylmaleic anhydride, maleinimide, methylmaleinimide;

fumaric acid and fumaric acid derivatives such as mono- and diesters of fumaric acid;

dienes such as divinyl benzene.

Really especially preferred mixtures contain methyl methacrylate, butyl methacrylate, lauryl methacrylate, stearyl methacrylate and/or styrene.

The components can be used individually or as mixtures. However, a requirement is that at least two different monomers are polymerized.

Gradient copolymers are easily prepared by ATRP methods, since they have a living character. Thus, gradient copolymers can be obtained by continuously varying the monomer mixture that is present during chain growth of the individual polymers.

This can be achieved, for example, by having the monomers present and continuously adding a different monomer mixture to this mixture. Preferably, here the monomers that vary over the individual chain are added to the reaction mixture via different inlets. "Continuously" means that the duration of the addition is large in relationship to the reaction time, thus in relation to chain growth. This can vary in wide limits. Without intending to imply any limitation, the ratio of addition time to total reaction time is greater than 1:10, preferably greater than 1:5, especially preferably greater than 1:3 and really especially preferably greater than 1:2. The previously mentioned monomers are polymerized by means of initiators that have a transferable atomic group. In general, these initiators can be described by the formula Y—(X)$_m$, where Y represents the case molecule, of which it is assumed that it forms radicals, X represents a transferable atom or a transferable atomic group and m is a whole number in the range of 1 to 10, depending on the functionality of group Y. If m>1, the various transferable atomic groups X can have differing importance. If the functionality of the initiator is >2, star polymers are obtained. Preferred transferable atoms or atomic groups are halogens such as Cl, Br and/or I.

As previously mentioned, it is assumed of group Y that it forms radicals, which serve as the starting molecule, where this radical adds to the ethylenically unsaturated monomers. For this reason group Y preferably has substituents that can stabilize radicals. Among these substituents are —CN, —COR and CO$_2$R, where in each case R is an alkyl or aryl residue or aryl and/or heteroaryl group.

Alkyl residues are saturated or unsaturated, branched or linear hydrocarbon residues with 1 to 40 carbon atoms, such as methyl, ethyl, propyl, butyl, pentyl, 2-methylbutyl, pentenyl, cyclohexyl, heptyl, 2-methylheptenyl, 3-methylheptyl, octyl, nonyl, 3-ethylnonyl, decyl, undecyl, 4-propenylundecyl, dodecyl, tridecyl, tetradecyl, pentadecyl, hexadecyl, heptadecyl, octadecyl, nonadecyl, eicosyl, cetyleicosyl, docosyl and/or eicosyltetratriacontyl.

Aryl residues are cyclic aromatic residues that have 6 to 14 carbon atoms in the aromatic ring. These residues can be substituted. Substituents are, for example, linear and branched alkyl groups with 1 to 6 carbon atoms such as methyl, ethyl, propyl, butyl, pentyl, 2-methylbutyl or hexyl; cycloalkyl groups such as cyclopentyl and cyclohexyl; aromatic groups such as phenyl or naphthyl; amino groups, ether groups, ester groups and halides.

Among the aromatic residues are, for example, phenyl, xylyl, toluyl, naphthyl or biphenyl.

The term "heteroaryl" identifies a heteroaromatic ring system, where at least one CH group is replaced by N or two neighboring CH groups by S, O or NH, such as a residue of thiophene, furan, pyrrole, thiazole, oxazole, pyridine, pyrimidine and benzo[a]furan, which likewise can have the previously mentioned substituents.

An initiator that can be used in accordance with the invention can be any compound that has one or more atoms or atomic groups that are radically transferable under the polymerization conditions.

Suitable initiators include those of the formulas:

$R^{11}R^{12}R^{13}C—X$ $R^{11}C(=O)—X$ $R^{11}R^{12}R^{13}Si—x$ $R^{11}R^{12}N—X$ $R^{11}N—X_2$ $(R^{11})_nP(O)_m—X_{3-n}$ $(R^{11}O)_nP(O)_m—X_{3-n}$ and $(R^{11})(R^{12}O)P(O)_m—X,$ where X is selected from the group consisting of Cl, Br, I, $OR^{10}$, [where $R^{10}$ is an alkyl group with 1 to 20 carbon atoms, where each hydrogen atom can independently be replaced by a halide, preferably chloride or fluoride, an alkenyl with 2 to 20 carbon atoms, preferably vinyl, an alkynyl with 2 to 10 carbon atoms, preferably acetylenyl or phenyl, which can be substituted with 1 to 5 halogen atoms or alkyl groups with 1 to 4 carbon atoms, or aralkyl (aryl-substituted alkyl in which the aryl group is phenyl or substituted phenyl and the alkyl group is an alkyl with 1 to 6 carbon atoms, such as benzyl, for example)], $SR^{14}$, $SeR^{14}$, $OC(=O)R^{14}$, $OP(=O)R^{14}$, $OP(=O)(OR^{14})_2$, $OP(=O)OR^{14}$, $O—N(R^{14})_2$, $S—C(=S)N(R^{14})_2$, CN, NC, SCN, CNS, OCN, CNO and $N_3$, where $R^{14}$ means an alkyl group or a linear or branched alkyl group with 1 to 20, preferably 1 to 10 carbon atoms, where two $R^{14}$ groups, is present, together can form a 5, 6 or 7-member heterocyclic ring; and $R^{11}$, $R^{12}$ and $R^{13}$ are independently chosen from the group consisting of hydrogen, halogens, alkyl groups with 1 to 20, preferably 1 to 10 and especially preferably 1 to 6 carbon atoms, cycloalkyl groups with 3 to 8 carbon atoms, $R^{8*}_3Si$, $C(=Y^*)R^{5*}$, $C(=Y^*)NR^{6*}R^{7*}$, where $Y^*$, $R^{5*}$, $R^{6*}$ and $R^{7*}$ are defined as above, COCl, OH, (preferably one of the residues $R^{11}$, $R^{12}$ and $R^{13}$ is OH), CN, alkenyl or alkynyl groups with 2 to 20 carbon atoms, preferably 2 to 6 carbon atoms and especially preferably allyl or vinyl, oxiranyl, glycidyl, alkylene or alkenylene groups with 2 to 6 carbon atoms, which are substituted with oxiranyl or glycidyl, aryl, heterocyclyl, aralkyl, aralkenyl (aryl-substituted alkenyl, where aryl is defined as above and alkenyl is vinyl, which is substituted with one or two $C_1$ to $C_6$ alkyl groups and/or halogen atoms, preferably with chlorine), alkyl groups with 1 to 6 carbon atoms, in which one up to all of the hydrogen atoms, preferably one, is/are substituted by halogen (preferably fluorine or chlorine, if one or more hydrogen atoms are replaced, and preferably fluorine, chlorine or bromine, if one hydrogen atom is replaced), alkyl groups with 1 to 6 carbon atoms, which with 1 to 3 substituents (preferably 1) are chosen from the group consisting of $C_1$-$C_4$ alkoxy, aryl, heterocyclyl, $C(=Y^*)R^{5*}$, (where $R^{5*}$ is defined as above), $C(=Y^*)NR^{6*}R^{7*}$ (where $R^{6*}$ and $R^{7*}$ are defined as above), oxiranyl and glycidyl (preferably not more than 2 of the residues $R^{11}$, $R^{12}$ and $R^{13}$ are hydrogen, especially preferably a maximum of one of the resides $R^{11}$, $R^{12}$ and $R^{13}$ is hydrogen);

m is 0 or 1; and m=0, 1 or 2 [sic].

Among the especially preferred initiators are benzyl halides like p-chloromethylstyrene, α-dichloroxylene, α,α-diochloroxylene, α,α-dibromoxylene and hexakis(α-bromomethyl)benzene, benzyl chloride, benzyl bromide, 1-bromo-1-phenylethane and 1-chloro-1-phenylethane;

carboxylic acid derivatives that are halogenated in α position, such as propyl 2-bromopropionate, methyl 2-chloropropionate, ethyl 2-chloropropionate, methyl 2-bromopropionate, ethyl 2-bromoisobutyrate; tosyl halides such as p-toluenesulfonyl chloride; alkyl halides like tetrachloromethane, tribromomethane, 1-vinylethyl chloride, 1-vinylethyl bromide; and halogen derivatives of phosphoric acid esters like dimethylphosphoric chloride.

The initiator is, in general, used in a concentration in the range of $10^{-4}$ mol/L to 3 mol/L, preferably in the range of $10^{-3}$ mol/L to $10^{-1}$ mol/L and especially preferably in the range of $5 \times 10^{-2}$ mol/L to $5 \times 10^{-1}$ mol/L, without any limitation intended by this. The molecular weight of the polymer results from the ratio of initiator to monomer, if all of the monomer is converted. Preferably this ratio lies in the range of $10^{-4}$ to 1 up to 0.5 to 1, especially preferably in the range of $5 \times 10^{-3}$ to 1 up to $5 \times 10^{-2}$ to 1.

Catalysts that contain at least one transition metal are used to conduct the polymerization. Here any transition metal compound that can produce a redox cycle with the initiator or the polymer chain that has a transferable atomic group can be used. In these cycles the transferable atomic group and the catalyst reversibly form a compound, with the degree of oxidation of the transition metal being increased or decreased. Here one assumes that radicals are released or trapped, so that the concentration of radicals stays very low. However, it is also possible that the insertion of ethylenically unsaturated monomers into the Y—X or $Y(M)_z$—X bond will be enabled or facilitated by the addition of the transition metal compound to the transferable atomic group, where Y and X have the meaning given above and M means the monomer, while z represents the degree of polymerization.

Preferred transition metals here are Cu, Fe, Cr, Co, Ne, Sm, Mn, Mo, Ag, Zn, Pd, Pt, Re, Rh, Ir, In, Yd, and/or Ru, which are used in appropriate degrees of oxidation. These metals can be used individually and as mixtures. It is assumed that these metals catalyze the redox cycles of the polymerization, with the redox pairs $Cu^+/Cu^{2+}$ or $Fe^{2+}/Fe^{3+}$, for example, being active. Accordingly, the metal compounds are added to the reaction mixture as halides such as chloride or bromide, as alkoxide, hydroxide, oxide, sulfate, phosphate or hexafluorophosphate or trifluoromethane sulfate. Among the preferred metallic compounds are $Cu_2O$, $CuBr$, $CuCl$, $CuI$, $CuN_3$, $CuSCN$, $CuCN$, $CuNO_2$, $CuNO_3$, $CuBF_4$, $Cu(CH_3COO)$ $Cu(CF_3COO)$, $FeBr_2$, $RuBr_2$, $CrCl_2$ and $NiBr_2$.

However, compounds in higher oxidation states can also be used, for example $CuBr_2$, $CuCl_2$, $CuO$, $CrCl_3$, $Fe_2O_3$ and $FeBr_3$. In these cases the reaction can be initiated with the aid of classical radical formers such as AIBN. Here the transition metal compounds are reduced at first, since they are reacted with the radicals generated from the classical radical formers. This is the reverse ATRP, as described by Wang and Matyjaszewski in Macromolecules (1995) Vol. 28, pp. 7572–7573.

Moreover, the transition metals can be used for catalysis as metal in the zero oxidation state, especially in mixtures with the previously mentioned compounds, as is indicated, for example, in WO 98/40415. In these cases the reaction rate of the conversion can be increased. One assumes that in this way the concentration of catalytically active transition metal compound is increased by proportionating transition metals in a high oxidation state with metallic transition metal.

The molar ratio of transition metal to initiator lies in general in the range of 0.0001:1 to 10:1, preferably in the range of 0.001:1 to 5:1 and especially preferably in the range of 0.01:1 to 2:1, without this intending to imply any limitation.

The polymerization takes place in the presence of ligands that can form a coordination compound with the metallic catalyst(s). These ligands serve, among other things, to increase the solubility of the transition metal compound. Another important function of the ligands is that the formation of stable organometallic compounds is avoided. This is particularly important, since these stable compounds would not polymerize under the selected reaction conditions. In addition, it is assumed that the ligands facilitate the abstraction of the transferable atomic group.

These ligands are substantially known and are described, for example, in WO 97/18247 and WO 98/40415. These compounds in general have one or more nitrogen, oxygen, phosphorus and/or sulfur atoms, via which the metal atom can be bonded. Many of these ligands can, in general, be represented by the formula $R^{16}$—Z—$(R^{18}$—Z$)_m$—$R^{17}$, where $R^{16}$ and $R^{17}$ independently mean H, $C_1$ to $C_{20}$ alkyl, aryl, heterocyclyl, which can optionally be substituted. These substituents include, among others, alkoxy residues and the alkylamino residues. $R^{16}$ and $R^{17}$ can optionally form a saturated, unsaturated or heterocyclic ring. Z means O, S, NH, $NR^{19}$, or $PR^{19}$, where $R^{19}$ has the same meaning as $R^{16}$. $R^{18}$ means, independently, a divalent group with 1 to 40 C atoms, preferably 2 to 4 C atoms, which can be linear, branched or cyclic, such as a methylene, ethylene, propylene or butylene group. The meanings of alkyl and aryl were given above. Heterocyclyl residues are cyclic residues with 4 to 12 carbon atoms, in which one or more of the $CH_2$ groups of the ring has been replaced by heteroatom groups like O, S, NH and/or NR, where the residue R has the same meaning as $R^{16}$.

Another group of suitable ligands can be represented by the formula

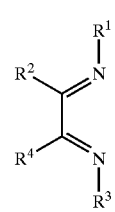

(IV)

where $R^1$, $R^2$, $R^3$ and $R^4$ independently mean H, $C_1$–$C_{20}$ alkyl, aryl, heterocyclyl and/or heteroaryl residues, where the residues $R^1$ and $R^2$ or $R^3$ and $R^4$ together can form a saturated or unsaturated ring.

Preferred ligands here are chelate ligands that contain N atoms.

Among the preferred ligands are triphenylphosphane, 2,2-bipyridine, alkyl-2,2-bipyridines like 4,4-di-(5-nonyl)-2,2-bipyridine, 4,4-di-(5-heptyl)-2,2 bipyridine, tris(2-aminoethyl)amine (TREN), N,N,N',N',N"-pentamethyldiethylenetriamine, 1,1,4,7,10,10-hexamethyltriethylenetetraamine and/or tetramethylethylenediamine. Other preferred ligands are described, for example, in WO 97/47661. The ligands can be used individually or as a mixture.

These ligands can form coordination compounds in situ with the metal compounds or they can be prepared initially as coordination compounds and then added to the reaction mixture.

The ratio of ligand to transition metal is dependent upon the dentation of the ligand and the coordination number of the transition metal. In general, the molar ratio is in the range of 100:1 to 0.1:1, preferably 6:1 to 0.1:1 and especially preferably 3:1 to 0.5:1, without this intending to imply any limitation.

The monomers, the transition metal catalysts, the ligands and the initiators are chosen in each case according to the desired polymer solution. It is assumed that a high rate constant for the reaction between the transition metal-ligand complex and the transferable atomic group is important for a narrow molecular weight distribution. If the rate constant of this reaction is too low, the concentration of radicals will be too high, so that the typical termination reactions that are responsible for a broad molecular weight distribution will occur. The exchange rate is, for example, dependent on the transferable atomic group, the transition metal, the ligands and the anion of the transition metal compound. The specialist will find valuable advice for choosing these components in WO 98/40415, for example.

In addition to the previously illustrated ATRP methods, the gradient copolymers in accordance with the invention can also be obtained, for example, via RAFT methods ("Reversible Addition Fragmentation Chain Transfer"). This method is extensively presented in WO 98/01478, for example, to which reference is expressly made for purposes of the disclosure.

The polymerization can be carried out at normal pressure, reduced pressure or elevated pressure. The polymerization temperature is also not critical. However, in general, it lies in the range of −20 to 200° C., preferably 0 to 130° C. and especially preferably 60 to 120° C., without any limitation intended by this.

The polymerization can be carried out with or without solvents. The term solvent is to be broadly understood here.

Preferably the polymerization is carried out in a nonpolar solvent. Among these solvents are hydrocarbon solvents such as aromatic solvents like toluene, benzene and xylene, saturated hydrocarbons such as cyclohexane, heptane, octane, nonane, decane, dodecane, which can also occur in branched form. These solvents can be used individually and as a mixture. Especially preferred solvents are mineral oils and synthetic oils and mixtures of these. Of these, mineral oils are really especially preferred.

Mineral oils are substantially known and commercially available. They are, in general, obtained from petroleum or crude oil by distillation and/or refining and optionally additional purification and processing methods, especially the higher-boiling fractions of crude oil or petroleum fall under the concept of mineral oil. In general, the boiling point of the mineral oil is higher than 200° C., preferably higher than 300° C., at 50 mbar. Preparation by low temperature distillation of shale oil, coking of hard coal, distillation of lignite under exclusion of air as well as hydrogenation of hard coal or lignite is likewise possible. To a small extent, mineral oils are also produced from raw materials of plant origin (for example jojoba, rapeseed oil) or animal origins (for example neatsfoot oil). Accordingly, mineral oils exhibit different amounts of aromatic, cyclic, branched and linear hydrocarbons in each case, according to origin.

In general, one distinguishes paraffin-base naphthenic and aromatic fractions in crude oil or mineral oil, where the term paraffin-base fraction stands for longer-chain or highly branched isoalkanes and naphthenic fraction stands for cycloalkanes. Moreover, mineral oils, in each case according to origin and processing, exhibit different fractions of n-alkanes, isoalkanes with a low degree of branching, so called monomethyl-branched paraffins, and compounds with heteroatoms, especially O, N and/or S, to which polar properties are attributed. The fraction of n-alkanes in the preferred mineral oils is less than 3 wt %, the fraction of O, N and/or S-containing compounds is less than 6 wt %. The fraction of aromatic compounds and monomethyl-branched paraffins is in general in each case in the range of 0 to 30 wt %. In accordance with one interesting aspect, mineral oil comprises mainly naphthenic and paraffin-based alkanes, which, in general, have more than 13, preferably more than 18 and really especially preferably more than 20 carbon atoms. The fraction of these compounds is, in general, $\geq 60$ wt %, preferably $\geq 80$ wt %, without any limitation intended by this.

An analysis of especially preferred mineral oils, which was done with traditional methods such as urea dewaxing and liquid chromatography on silica gel, shows, for example, the following components, where the percentages refer to the total weight of the relevant mineral oil:

n-alkanes with about 18 to 31 C atoms:
0.7–1.0%,
low-branched alkanes with 18 to 31 C atoms:
1.0–8.0%,
aromatic compounds with 14 to 32 C atoms:
0.4–10.7%,
iso- and cycloalkanes with 20 to 32 C atoms:
60.7–82.4%,
polar compounds:
0.1–0.8%,
loss:
6.9–19.4%.

Valuable advice regarding the analysis of mineral oil as well as a list of mineral oils that have other compositions can be found, for example, in Ullmann's Encyclopedia of Industrial Chemistry, 5$^{th}$ Edition on CD-ROM, 1997, under the entry "lubricants and related products."

Synthetic oils are, among other substances, organic esters, organic ethers like silicone oils and synthetic hydrocarbons, especially polyolefins. They are, for the most part, somewhat more expensive than the mineral oils, but they have advantages with regard to performance. For an explanation, one should refer to the 5 API classes of base oil types (API: American Petroleum Institute), and these base oils can especially preferably be used as solvents.

These solvents can be used, among other ways, in an amount of 1 to 99 wt %, preferably 5 to 95 wt %, especially preferably 5 to 60 wt % and really especially preferably 10 to 50 wt %, with respect to the total weight of the mixture, without any limitation intended to be implied by this.

The polymers prepared in this way generally have a molecular weight in the range of 1,000 to 1,000,000 g/mol, preferably in the range of range of $10 \times 10^3$ to $500 \times 10^3$ g/mol and especially preferably in the range of $20 \times 10^3$ to $300 \times 10^3$ g/mol, without any limitation intended by this. These values refer to the weight average molecular weight of the polydisperse polymers in the composition.

The particular advantage of ATRP compared to the traditional radical polymerization methods lies in the fact that polymers with narrow molecular weight distribution can be made. Without intending any limitation by this, polymers that were produced by the method in accordance with the invention exhibit a polydispersity, given by $M_w/M_n$, in the range of 1 to 12, preferably 1 to 4.5, especially preferably 1 to 3, and really especially preferably 1.05 to 2.

The copolymers in accordance with the invention find use, among other things, as additives to lubricant oils and diesel biofuels to reduce the pour point. Thus, other interesting aspects of this invention are lubricants and diesel biofuels that contain copolymers in accordance with the invention.

The copolymers in accordance with the invention can be used individually or as a mixture, where the term "mixture" is to be understood broadly. It includes both mixtures of different copolymers of this invention as well as mixtures of copolymers in accordance with the invention with traditional polymers.

Diesel biofuels are substantially known and designate natural, especially renewable oils, which are suitable for operation of specially adapted diesel engines. These diesel fuels include, for example, plant oils such as rapeseed oil.

Examples of lubricants are, among other things, motor oils, machine oils, turbine oils, hydraulic fluids, pump oils, heat transfer oils, insulation oils, cutting fluids and cylinder oils.

These lubricants contain, in general, a base oil and one or more additives, which are, to a large extent, known among specialists.

In principle, any compound is suitable as base oil if it provides a sufficient lubricant film that also does not break at elevated temperatures. The viscosities, for example, can serve to determine this property, as they are established, for example, for motor oils in the SAE specifications.

Compounds that are suitable for this are, among others, natural oils, mineral oils and synthetic oils, as well as mixtures of these.

Natural oils are animal or vegetable oils such as neatsfoot oil or jojoba oils. Mineral oils have been extensively described as solvents previously. They are particularly advantageous because of their favorable price. Synthetic oils are, among others, organic esters, synthetic hydrocarbons, especially polyolefins, which meet the requirements mentioned above. They are, for the most part, more expensive than the mineral oils, but they have advantages with regard to their performance.

These base oils can also be used as mixtures and are widely commercially available.

The copolymers in accordance with the invention can also be used as components of the so called DI (detergent inhibitor) packets or other concentrates that are added to lubricants and that are largely known. These concentrates include 15 to 85 wt % of one or more copolymers of this invention. In addition, the concentrate can additionally contain organic solvents, especially a mineral oil and/or a synthetic oil.

Besides the base oil, lubricant oils or the aforementioned concentrates, in general, contain additives. Among these additives are viscosity index improvers, antioxidants, anti-aging agents, corrosion inhibitors, detergents, dispersants, EP additives, foam inhibitors, friction reducing agents, pour point depressants, dyes, odorants and/or deemulsifiers.

The additives bring about favorable flow behavior and low and high temperatures (improvement of viscosity index), they suspend solids (detergent-dispersant behavior), they neutralize acid reaction products and they form a protective film on the cylinder surface (EP additives, EP for "extreme pressure"). The specialist will find additional valuable advice in Ullmann's Encyclopedia of Industrial Chemistry, Fifth Edition on CD-ROM, 1998.

The quantities in which these additives are used are dependent on the area of use of the lubricant. In general, the amount of the base oil is, however, between 25 and 90 wt %, preferably 50 to 75 wt %. The amount of copolymers of this invention in lubricant oils is preferably in the range of 0.01 to 10 wt %, especially preferably 0.01 to 2 wt %. Diesel biofuels contain the polymers of this invention preferably in an amount in the range of 0.01 to 10 wt %, especially 0.01 to 2 wt %.

The invention is illustrated in more detail below by examples and comparison examples, without any intention to limit the invention to these examples.

In the following tests, the pour points were determined in accordance with ASTM D 97-93, the MRV values in accordance with ASTM 4684-92 and the scanning Brookfield result in accordance with ASTM D 5133-90. The gelation index is the maximum of the first mathematical derivative of the viscosity-temperature diagram of the scanning Brookfield measurement. With regard to the yield stress value of the MRV measurement, it should be taken into account that measurement values smaller than 35 Pa are given as 0 due to the measurement precision.

EXAMPLES AND COMPARISON EXAMPLES

The ATRP polymerization experiments were carried out in a round bottom flask that was equipped with a saber stirrer, heating mantle, nitrogen inlet, rapid cooling system and dropping funnel. In this case, 100 g of the SMA/LMA mixture (SMA: mixture of long-chain methacrylates obtained from the reaction of methyl methacrylate with ®Dehydad (Henkel KGaA); LMA: mixture of long-chain methacrylates obtained from the reaction of methyl methacrylate with ®Lorol (Henkel KGaA)) were present in a 41:59 weight ratio together with 50 g mineral oil (Petro, Canada) in the reaction flask, and were inertized by the addition of dry ice and feed of nitrogen. Then the mixture was heated to 95° C. with stirring. During the heating operation, 0.52 g CuBr and 1.25 g PMDETA (pentamethyldiethylenetriamine) were added at about 70° C. After reaching the given temperature of 95° C., 0.71 g EBiB (ethyl 2-bromoisobutyrate) was added, whereupon a heterogeneous mixture formed, since the catalyst was only partially dissolved.

After a reaction time of 15 minutes at 95° C., the addition of 100 g SMA/LMA mixture with an SMA:LMA weight ratio of 48:52 was initiated. The addition took place at a constant flow rate over a period of 2 hours. After completion of the addition, the mixture was stirred for another 2 hours at 95° C.

Then the mixture was cooled to room temperature, diluted with about 400 mL toluene and filtered through 10 g $Al_2O_3$ in order to remove contaminants. Then, the toluene was distilled out on a rotary evaporator. The mixture was analyzed by GPC in order to determine the number average molecular weight ($M_n$) and the polydispersity $M_w/M_n$ (PDI).

Then the amount of the resulting polymer given in Table 1 was mixed with a 15W-40 (SAE) motor oil for automobiles, which consisted of a mixture of a Group I and Group II mineral oil (weight ratio 1:4). Then, the efficiency of the additive was tested according to the previously indicated tests. The results are likewise presented in Table 1.

For comparison purposes, a copolymer mixture in accordance with EP-A-0 861 859 was prepared. Here the same mixtures (41:59 and 48:52 SMA:LMA mixtures) were used. However, gradient copolymers were not obtained, but rather physical mixtures of statistical copolymers, since the lifetime of the radicals formed during the polymerization was small in ratio to the change of the monomer mixture.

TABLE 1

| | Example 1 | Example 2 | Comparison |
|---|---|---|---|
| Mn | 56100 | 56100 | 55800 |
| PDI | 1.35 | 1.35 | 2.34 |
| Polymer content of mixture (wt. %) | 0.024 | 0.036 | 0.03 |
| Pour Point | −42 | −45 | −39 |
| MRV | | | |
| Viscosity (Pa · sec) | 25.7 | 25.7 | 31.3 |
| Yield Stress [pa] | 0 | 0 | 0 |
| Scanning-Brookfield | | | |
| Viscosity at −20° C. (mPa · sec) | 12000 | 39000 | fest |
| Temperature at 30000 mPa · sec [° C.] | −34.5 | −28.8 | −26.1 |
| Gelation index at ° C. | 5.8 at −13 | 9.9 at −24 | 13.8 at −22 |

What is claimed is:

1. Gradient copolymers obtained by polymerizing a mixture of olefinically unsaturated monomers that consists of a) 0 to 40% by weight of one or more ethylenically unsaturated ester compounds of formula (I)

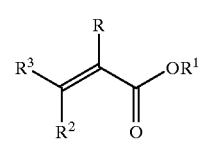

where R is hydrogen or methyl, $R^1$ means a linear or branched alkyl residue with 1 to 5 carbon atoms, $R^2$ and $R^3$ independently represent hydrogen or a group of the formula —COOR', where R' means hydrogen or an alkyl group with 1 to 5 carbon atoms, b) 10 to 98% by weight of one or more ethylenically unsaturated ester compounds of formula (II)

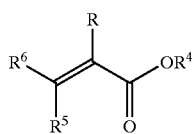

(II)

where R is hydrogen or methyl, $R^4$ means a linear or branched alkyl residue with 6 to 15 carbon atoms, $R^5$ and $R^6$ independently are hydrogen or a group of the formula —COOR", where R" means hydrogen or an alkyl group with 6 to 15 carbon atoms, c) 0 to 80% by weight of one or more ethylenically unsaturated ester compounds of formula (III)

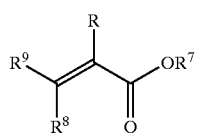

(III)

where R is hydrogen or methyl, $R^7$ means a linear or branched alkyl residue with 16 to 30 carbon atoms, $R^8$ and $R^9$ independently are hydrogen or a group of the formula —COOR'" where R'" means hydrogen or an alkyl group with 16 to 30 carbon atoms, d) 0 to 50% by weight comonomer, in each case with respect to the total weight of the ethylenically unsaturated monomers, where the mixture of the ethylenically unsaturated monomers is varied during chain growth in order to obtain copolymers that have a gradient.

2. Gradient copolymers as in claim 1, wherein said gradient of the copolymer amounts to more than 5%.

3. Gradient copolymers as in claim 1 or 2, wherein said copolymer has a linear gradient.

4. Gradient copolymers as in claim 1, wherein that the weight average molecular weight of the copolymer lies in the range of 10,000–500,000 g/mol.

5. Gradient copolymers as in claim 1, wherein the polydispersity ($M_w/M_n$) lies in the range of 1 to 12.

6. A concentrate as lubricant oil additive, wherein said concentrate contains 15 to 85% by weight of one or more gradient copolymers in accordance with claim 1.

7. A concentrate as in claim 6, further comprising organic solvents.

8. A lubricant oil containing gradient copolymers as in claim 1.

9. A concentrate as in claim 6, or lubricant oil as in claim 8, further comprising an element selected from the group consisting of viscosity index improvers, antioxidants, corrosion inhibitors, detergents, dispersants, EP additives, foam inhibitors, friction reducers and/or deemulsifiers.

10. A diesel biofuel containing gradient polymers as in claim 1.

11. A diesel biofuel as in claim 10, wherein said gradient copolymer is present in an amount in the range of 0.01 to 10% by weight.

12. A method of improving the pour point depression and flow of a lubricant oil comprising adding the copolymer of claim 1 to a lubricant oil.

13. The copolymer of claim 5, wherein said gradient copolymer has a polydispersity of 1.05 to 2.

14. The concentrate of claim 7 wherein said organic solvent is selected from the group consisting of a mineral oil, a synthetic oil and a mixture thereof.

15. The diesel biofuel of claim 11, wherein said gradient copolymer is present in an amount of 0.01 to 2% by weight.

16. A lubricant oil as in claim 8 wherein said gradient copolymer is present in an amount in the range of 0.01 to 10% by weight.

17. The lubricant oil of claim 16, wherein said gradient copolymer is present in an amount of 0.01 to 2% by weight.

* * * * *

UNITED STATES PATENT AND TRADEMARK OFFICE
CERTIFICATE OF CORRECTION

PATENT NO. : 6,403,745 B1
DATED : June 11, 2002
INVENTOR(S) : Scherer et al.

It is certified that error appears in the above-identified patent and that said Letters Patent is hereby corrected as shown below:

Title page,
*Assistant Examiner* "K," should read, -- K. --.

Column 1,
Line 19, "-15º C. is", should read -- -15ºC. is --.

Column 5,
Line 51, "(meth)acrylates fumarates", should read -- (meth)acrylatesfumarates --.

Column 10,
Line 19, "resides" should read -- residues --.
Line 23, "diochloroxylene" should read -- dichloroxylene --.
Line 59, "Ne" should read -- Ni --.

Column 12,
Line 60, "200º C." should read -- 200ºC. --.
Line 60, "130º C." should read -- 130ºC. --.
Line 61, "120º C." should read -- 120ºC. --.

Column 13,
Line 12, "200º C." should read -- 200ºC. --.
Line 13, "300º C." should read -- 300ºC. --.

Column 15,
Lines 62 and 66, "95º C." should read -- 95ºC. --.

UNITED STATES PATENT AND TRADEMARK OFFICE
CERTIFICATE OF CORRECTION

PATENT NO. : 6,403,745 B1
DATED : June 11, 2002
INVENTOR(S) : Scherer et al.

It is certified that error appears in the above-identified patent and that said Letters Patent is hereby corrected as shown below:

Column 16,
Line 4, "95º C." should read -- 95ºC. --.
Line 38, TABLE 1, "[pa]" should read -- [Pa] --.
Line 40, TABLE 1, "20º C." should read -- 20ºC. --.
Line 40, TABLE 1, "fest" should read -- solid --.
Lines 42 and 43, TABLE 1, "[º C.]" should read -- [ºC.] --.

Signed and Sealed this

Twenty-fifth Day of February, 2003

JAMES E. ROGAN
*Director of the United States Patent and Trademark Office*